(12) United States Patent
Yumita et al.

(10) Patent No.: US 12,522,101 B2
(45) Date of Patent: Jan. 13, 2026

(54) SERVER AND POWER SUPPLY AND DEMAND BALANCING METHOD

(71) Applicant: TOYOTA JIDOSHA KABUSHIKI KAISHA, Toyota (JP)

(72) Inventors: Osamu Yumita, Seto (JP); Yoichi Onishi, Okazaki (JP); Toru Ando, Obu (JP); Ikuma Suzuki, Okazaki (JP); Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 18/199,090

(22) Filed: May 18, 2023

(65) Prior Publication Data
US 2024/0025288 A1 Jan. 25, 2024

(30) Foreign Application Priority Data
Jul. 22, 2022 (JP) ................................ 2022-116925

(51) Int. Cl.
*B60L 53/63* (2019.01)
*G01C 21/34* (2006.01)
*H02J 3/00* (2006.01)

(52) U.S. Cl.
CPC .......... *B60L 53/63* (2019.02); *G01C 21/3469* (2013.01); *G01C 21/3484* (2013.01); *H02J 3/003* (2020.01)

(58) Field of Classification Search
CPC ...... B60L 53/63; H02J 3/003; G01C 21/3469; G01C 21/3484

USPC ........................................................ 700/291
See application file for complete search history.

(56) References Cited

U.S. PATENT DOCUMENTS

| | | | |
|---|---|---|---|
| 10,429,199 B2* | 10/2019 | Mason | G06Q 10/063112 |
| 11,348,140 B2* | 5/2022 | Busch | H04W 4/029 |
| 2020/0234575 A1 | 7/2020 | Hishida et al. | |
| 2021/0182993 A1* | 6/2021 | Arian | G06Q 30/02 |
| 2021/0252993 A1 | 8/2021 | Kinomura et al. | |
| 2021/0334719 A1* | 10/2021 | Hishida | G06Q 10/1093 |
| 2021/0380012 A1* | 12/2021 | Tsuda | G06Q 30/0283 |
| 2023/0256855 A1* | 8/2023 | Sartipizadeh | B60L 53/64 320/109 |

(Continued)

FOREIGN PATENT DOCUMENTS

| | | |
|---|---|---|
| EP | 3882069 A1 | 9/2021 |
| JP | 2018-081022 A | 5/2018 |
| JP | 2021-129441 A | 9/2021 |

*Primary Examiner* — Md Abul Azad
(74) *Attorney, Agent, or Firm* — Dinsmore & Shohl LLP (57) ABSTRACT

A server manages power balancing resources electrically connected to a power network. The server includes a processor. In response to receipt of input of a travel schedule including a date and time of travel, a departure point, and a destination point from a user of the vehicle, the processor predicts a power supply and demand balance on the power network for the date and time of travel, based on power supply and demand performance information of the power network. In response to prediction that the power supply and demand balance is going to be adjusted on the date and time of travel, the processor provides the user suggestion to keep the vehicle connected to the power equipment on the date and time of travel and a reward for the vehicle responding to a request to adjust the power supply and demand balance.

11 Claims, 6 Drawing Sheets

(56) References Cited

U.S. PATENT DOCUMENTS

2025/0086545 A1\* 3/2025 Smith .................. G01C 21/343

\* cited by examiner

SERVER AND POWER SUPPLY AND DEMAND BALANCING METHOD

CROSS-REFERENCE TO RELATED APPLICATION

This application claims priority to Japanese Patent Application No. 2022-116925 filed on Jul. 22, 2022 incorporated herein by reference in its entirety.

BACKGROUND

1. Technical Field

The present disclosure relates to servers and power supply and demand balancing methods.

2. Description of Related Art

Japanese Unexamined Patent Application Publication No. 2021-129441 (JP 2021-129441 A) discloses a power management system for managing power that is transferred between bidirectional charging stations to which a plurality of electrified vehicles can be connected and a power network. In this power management system, a server balances power that is transferred between the bidirectional charging stations and the power network by using electrified vehicles that are connected to the bidirectional charging stations during a period including a power supply and demand balancing period on the power network.

SUMMARY

In the above power management system, electrified vehicles that are not connected to the bidirectional charging stations during the power balancing period on the power network cannot respond to a request to participate in power balancing. In this case, since these electrified vehicles cannot be used as power balancing resources, it may be difficult to adjust the power supply and demand balance on the power network.

The present disclosure provides a method for keeping the power supply and demand balance on a power network while taking user benefits (convenience and economic value) into account.

A server according to a first aspect of the present disclosure is a server that is configured to manage power balancing resources electrically connected to a power network. The power balancing resources include power equipment configured to supply power from a vehicle to the power network and to charge the vehicle from the power network. The server includes a processor and a memory storing a program that is executable by the processor. The processor is configured to, in response to receipt of input of a travel schedule including a date and time of travel, a departure point, and a destination point from a user of the vehicle, predict a power supply and demand balance on the power network for the date and time of travel according to the program, based on power supply and demand performance information of the power network. The processor is configured to, in response to prediction that the power supply and demand balance is going to be adjusted on the date and time of travel, provide the user at least one of: suggestion to keep the vehicle connected to the power equipment on the date and time of travel; and a reward for the vehicle responding to a request to adjust the power supply and demand balance.

According to the above aspect, the user can select to either travel to the destination point with the vehicle on the day of travel, or keep the vehicle connected to the power equipment as suggested by the server to have the vehicle participate in adjusting the power supply and demand balance, based on his or her schedule for the day of travel. Alternatively, the user can receive the reward in the case where the user uses a mode of transportation other than the vehicle on the day of travel to have the vehicle participate in adjusting the power supply and demand balance. The server can thus encourage the user to have the vehicle participate in adjusting the power supply and demand balance while ensuring convenience and economic value for the user. It is therefore possible to keep the power supply and demand balance while taking user benefits into account.

The processor may be configured to suggest traveling from the departure point to the destination point using public transportation as the suggestion.

According to the above aspect, suggesting traveling using public transportation allows the user to select to either travel with the vehicle, or travel with the public transportation to have the vehicle participate in adjusting the power supply and demand balance, based on his or her schedule for the day of travel. The user can also receive the reward for using the public transportation.

The processor may be configured to create a first travel route using the vehicle and at least one second travel route using the public transportation, based on the travel schedule. The processor may be configured to present the first travel route and the at least one second travel route together with required travel time of each travel route to the user.

According to the above aspect, the user can select a suitable travel route based on his or her schedule for the day of travel by taking the required travel time of each travel route presented by the server into account. It is thus possible to encourage the user to have the vehicle participate in adjusting the power supply and demand balance while ensuring convenience for the user.

The processor may be configured to calculate, for each of the first travel route and the at least one second travel route, power consumption per occupant during the required travel time. The processor is configured to set priorities for the first travel route and the at least one second travel route in ascending order of the power consumption per occupant. The processor is configured to present the first travel route and the at least one second travel route to the user in descending order of priority.

According to the above aspect, the user can select a suitable travel route by taking into account his or her schedule for the day of travel and the power consumption per occupant. In the case where the user selects a travel route with small power consumption per occupant, power consumption on the power network on the day of travel can be reduced.

The processor may be configured to predict, based on the power supply and demand performance information, a time period during which the power supply and demand balance is going to be adjusted on the date and time of travel, and present the predicted time period to the user.

According to the above aspect, the user can select a travel route that is considered suitable in terms of convenience and/or economic value for him or her, by taking into account his or her schedule for the day of travel and the time period during which the power supply and demand balance is going to be adjusted.

The processor may be configured to present information on the reward to the user.

According to the above aspect, the user can select a travel route that is considered suitable in terms of convenience and/or economic value for him or her, by taking his or her schedule for the day of travel and the reward into account.

The processor may be configured to, when the processor receives input of an attribute of the user together with the travel schedule, determine whether to provide the user the suggestion depending on the attribute of the user.

According to the above aspect, it is possible to suggest only those users who have no trouble using a mode of transportation other than the vehicle to keep the vehicle connected to the power equipment.

The processor may be configured to provide the suggestion when the user has a first attribute, and not to provide the suggestion when the user has a second attribute. The first attribute includes able-bodied. The second attribute includes at least one of the following: with disabilities, elderly, pregnant, and having a child.

According to the above aspect, those users who are likely to have reduced mobility will not be suggested to keep the vehicle connected to the power equipment. This ensures convenience for such users.

The processor may be configured to create a first travel route using the vehicle and at least one second travel route using public transportation, based on the travel schedule. The processor may be configured to calculate, for each of the first travel route and the at least one second travel route, the reward to be provided to the user and physical burden on the user. The processor is configured to set priorities for the first travel route and the at least one second travel route in descending order of the reward when the user has the first attribute. The processor is configured to set priorities for the first travel route and the at least one second travel route in ascending order of the physical burden when the user has the second attribute. The processor is configured to present the first travel route and the at least one second travel route to the user in descending order of priority.

According to the above aspect, a travel route with light physical burden is preferentially suggested to those users who are likely to have reduced mobility. This implements a suggestion considering user convenience.

A power supply and demand balancing method according to a second aspect of the present disclosure is a power supply and demand balancing method in which power balancing resources electrically connected to a power network is managed. The power balancing resources include power equipment configured to supply power from a vehicle to the power network and to charge the vehicle from the power network. The power supply and demand balancing method includes: in response to receipt of input of a travel schedule including a date and time of travel, a departure point, and a destination point from a user of the vehicle, predicting a power supply and demand balance on the power network for the date and time of travel, based on power supply and demand performance information of the power network; and, in response to prediction that the power supply and demand balance is going to be adjusted on the date and time of travel, providing the user at least one of suggestion to keep the vehicle connected to the power equipment on the date and time of travel and a reward for the vehicle responding to a request to adjust the power supply and demand balance.

According to the above aspect, the user can select to either travel to the destination point with the vehicle on the day of travel, or keep the vehicle connected to the power equipment as suggested by a server to have the vehicle participate in adjusting the power supply and demand balance, based on his or her schedule for the day of travel. Alternatively, the user can receive the reward in the case where the user uses a mode of transportation other than the vehicle on the day of travel to have the vehicle participate in adjusting the power supply and demand balance. The server can thus encourage the user to have the vehicle participate in adjusting the power supply and demand balance while ensuring convenience and economic value for the user. It is therefore possible to keep the power supply and demand balance on the power network while taking user benefits into account.

According to the present disclosure, the power supply and demand balance on the power network can be kept while taking user benefits (convenience and economic value) into account.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

Overall Configuration of Electric Power System

Figure 1:
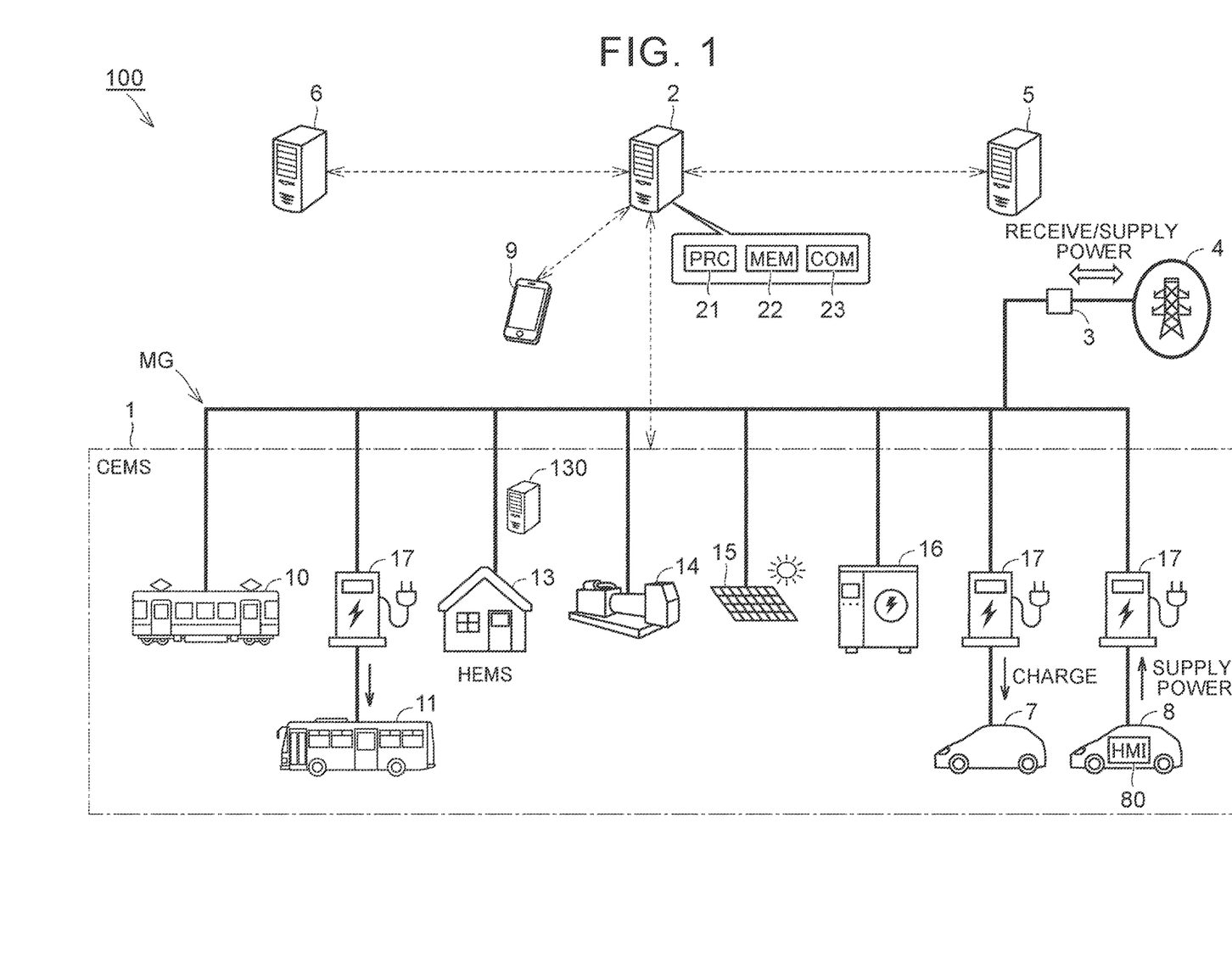
FIG. 1 shows a schematic configuration of an electric power system according to an embodiment.

FIG. 1 shows a schematic configuration of an electric power system according to an embodiment of the present disclosure. An electric power system 100 includes a CEMS 1, a CEMS server 2, a receiving substation 3, a power grid 4, a power transmission and distribution operator server 5, a public transportation server 6, and a user terminal 9. The term "CEMS" means a community energy management system or a city energy management system.

The CEMS 1 includes a home energy management system (HEMS) 13, a generator 14, a variable renewable energy source 15, an energy storage system (ESS) 16, a plurality of pieces of bidirectional charging equipment (electric vehicle supply equipment (EVSE)) 17, a plurality of vehicles 7, 8, a train 10, and a bus 11. In the CEMS 1, these components form a microgrid MG. The microgrid MG is an example of the "power network" according to the present disclosure.

The HEMS 13 is a system that manages supply and demand of power that is used at home. The HEMS 13 includes household appliances (lighting fixtures, air conditioners, other electrical appliances, etc.) that are operated by power supplied from the microgrid MG. The HEMS 13 may include a photovoltaic panel, a home heat pump system, a home cogeneration system, and a home energy storage battery. The HEMS 13 further includes an HEMS server 130 capable of bidirectional communication with the CEMS server 2.

The generator 14 is power generation equipment that is independent of weather conditions. The generator 14 outputs generated power to the microgrid MG. The generator 14 may include a steam turbine generator, a gas turbine generator, a diesel engine generator, a gas engine generator, a biomass generator, and a stationary fuel cell. The generator 14 may include a cogeneration system that uses heat generated during power generation.

The variable renewable energy source 15 is power generation equipment whose power generation output varies depending on weather conditions. The variable renewable energy source 15 outputs generated power to the microgrid MG. Although photovoltaic power generation equipment (photovoltaic panel) is illustrated in FIG. 1, the variable renewable energy source 15 may include wind power generation equipment instead of, or in addition to, the photovoltaic power generation equipment.

The energy storage system 16 is a stationary power source that stores power generated by the variable renewable energy source 15 etc. The energy storage system 16 is a secondary battery. For example, the energy storage system 16 is a lithium-ion battery or nickel metal hydride battery that is a battery used in a vehicle (recycled product). However, the energy storage system 16 is not limited to the secondary battery, and may be a power-to-gas device that produces gaseous fuel (hydrogen, methane, etc.) using surplus power.

Each piece of bidirectional charging equipment 17 is electrically connected to the microgrid MG, and is configured to perform charging and discharging (power supply) from and to the microgrid MG. The bidirectional charging equipment 17 is an example of the "power equipment."

Specifically, the vehicles 7, 8 may include a plug-in hybrid electric vehicle (PHEV), a battery electric vehicle (BEV), and a plug-in fuel cell electric vehicle (PFCEV). Each vehicle 8 includes a Human Machine Interface (HMI) 80 for transferring various kinds of information between a vehicle and a user. The HMI 80 is, for example, a display with a touch panel (not shown) for a navigation system. Although not shown in the figure, each vehicle 7 also includes an HMI.

At least part of the vehicles 7, 8 is configured to be supplied with power from the microgrid MG when a charging cable of the bidirectional charging equipment 17 is connected to an inlet (not shown) of the vehicle. This form of power supply is also referred to as "external charging." At least part of the vehicles 7, 8 is configured to supply power to the microgrid MG when the charging cable of the bidirectional charging equipment 17 is connected to the outlet (not shown) of the vehicle. This form of power supply is also referred to as "external power supply." The vehicles 7, 8 may include vehicles configured to perform both external charging and external power supply.

The train 10 is a railroad car intended to transport a plurality of passengers, and has passenger cars that passengers can get on and off. The train 10 travels on tracks as it is supplied with power from the microgrid MG. The train 10 is configured to perform power running using power supplied from the microgrid MG and regeneration in which the train 10 supplies regenerative power generated by regenerative braking back to the microgrid MG.

The bus 11 is a vehicle intended to transport a plurality of passengers, and is typically a transit bus or a highway coach.

The bus 11 is equipped with a battery that stores power for vehicle, and is configured to be supplied with power from the microgrid MG (perform external charging) when the charging cable is connected to an inlet (not shown) of the bus 11. The bus 11 is configured to perform either manual driving or autonomous driving. The bus 11 may be configured to switch between manual driving and autonomous driving. The train 10 and the bus 11 are examples of the "public transportation."

In the example shown in FIG. 1, the CEMS 1 includes one HEMS 13, one generator 14, one variable renewable energy source 15, one energy storage system 16, one train 10, and one bus 11. However, the CEMS 1 may include any number of these systems or pieces of equipment. The CEMS 1 may include a plurality of these systems or pieces of equipment. The CEMS 1 need not include part of these systems or pieces of equipment. The HEMS 13 may include equipment such as a generator, or may include the bidirectional charging equipment 17 and the vehicles 7, 8.

Although not shown in the figure, the CEMS 1 may further include a factory energy management system (FEMS) and a building energy management system (BEMS). The FEMS is a system that manages supply and demand of power that is used in a factory, and includes a factory building and industrial facilities that are operated by power supplied from the microgrid MG. The FEMS may include power generation equipment installed in the factory. The BEMS is a system that manages supply and demand of power that is used in a building such as office or commercial facility, and includes lighting fixtures and air conditioning units installed in the building. The BEMS may include power generation equipment or a cold heat source system (waste heat recovery system, thermal energy storage system, etc.). Each of the FEMS and the BEMS further includes a server capable of bidirectional communication with the CEMS server 2.

Each of the HEMS 13, the generator 14, the variable renewable energy source 15, the energy storage system 16, the pieces of bidirectional charging equipment 17 that are included in the CEMS 1 is an example of the "plurality of power balancing resources."

The CEMS server 2 is a computer that manages the power balancing resources in the CEMS 1. The CEMS server 2 includes a control device 21, a storage device 22, and a communication device 23. The control device 21 includes a processor and is configured to perform predetermined arithmetic processing. The storage device 22 includes a memory storing programs to be executed by the control device 21, and stores various kinds of information (maps, relational expressions, parameters, etc.) to be used in the programs. The communication device 23 includes a communication interface and is configured to communicate with the outside (other server etc.).

The CEMS server 2 may be an aggregator server. An aggregator is an electric utility that bundles a plurality of power balancing resources to provide an energy management service. The CEMS server 2 is an example of the "server." The server 130 in the HEMS 13 can be the "server."

The receiving substation 3 is provided at an interconnection point (grid connection point) of the microgrid MG, and is configured to switch between parallel-on (connection) and parallel-off (disconnection) of the microgrid MG and the power grid 4. Although not shown in the figure, the receiving substation 3 includes a high-voltage (primary) switchgear, a transformer, a protective relay, a measuring device, and a control device. When the microgrid MG is connected to the power grid 4, the receiving substation 3 receives alternating current (AC) power of, for example, extra high voltage (voltage higher than 7000 V) from the power grid 4, steps down the voltage of the received power, and supplies the resultant power to the microgrid MG.

The power grid 4 is a power network composed of power plants and power transmission and distribution facilities. In the present embodiment, an electric power company serves as both a power producer and a power transmission and distribution operator. The electric power company is a general power transmission and distribution operator and is also an administrator of the power grid 4, and maintains and manages the power grid 4.

The power transmission and distribution operator server 5 is a computer that belongs to the electric power company and manages power supply and demand of the power grid 4. The power transmission and distribution operator server 5 is configured to bidirectionally communicate with the CEMS server 2.

The public transportation server 6 is a computer that manages the operation of public transportation (train 10, bus 11, etc.). The public transportation server 6 is configured to bidirectionally communicate with the CEMS server 2.

The user terminal 9 is a terminal that is operable by a person who manages the vehicle 7, 8 (vehicle user). The user terminal 9 receives input from the user. In the present embodiment, the user terminal 9 is a smartphone with a touch panel display. The user terminal 9 has a built-in computer. The user terminal 9 is not limited to a smartphone. For example, the user terminal 9 may be a laptop, a tablet terminal, or a wearable terminal, etc.

The user terminal 9 is registered in the CEMS server 2 in advance, and is configured to bidirectionally communicate with the CEMS server 2. Application software for setting a travel route that will be described later (hereinafter also referred to as "mobile app") is installed on the user terminal 9. The user can make a travel schedule with the mobile app prior to a trip. The user terminal 9 can send and receive information to and from the CEMS server 2 via the mobile app.

Power Supply and Demand Balance

It is required to keep the power supply and demand balance on the microgrid MG in order to stabilize power. Therefore, the CEMS server 2 performs power balancing of the microgrid MG using the power balancing resources in the CEMS 1. The CEMS server 2 can cause the power balancing resources to serve as a virtual power plant (VPP) by remotely and integratedly controlling the power balancing resources.

The CEMS server 2 can perform demand response (DR) for each power balancing resource in order to integratedly control the power balancing resources as a VPP. This DR requests power balancing of the microgrid MG (e.g., an increase in power consumption, a reduction in power consumption, or a reverse power flow) to each power balancing resource.

Of the power balancing resources, the bidirectional charging equipment 17 can cause the vehicle connected to the bidirectional charging equipment 17 to perform the power balancing requested by the CEMS server 2. In the example of FIG. 1, the vehicle 7 can participate in DR by performing external charging, and the vehicle 8 can participate in DR by performing external power supply.

The users of the vehicles participating in DR permit the CEMS server 2 to remotely control the vehicles. In the situation where the CEMS server 2 is permitted to remotely control the vehicles, the CEMS server 2 controls the bidirectional charging equipment 17 so that the vehicles perform power balancing of the microgrid MG (increase charging, reduce charging, or discharge power). The vehicles 7, 8 can thus perform external charging or external power supply in response to the request to participate in DR from the CEMS server 2.

However, even when participation in DR is requested from the CEMS server 2, the vehicle cannot participate in DR if the vehicle is not connected to the bidirectional charging equipment 17. This may hinder smooth power balancing of the microgrid MG. The user of the vehicle is therefore required to connect the vehicle to the bidirectional charging equipment 17 in advance according to the time period during which DR is expected to be performed.

However, the user cannot use the vehicle while the vehicle is connected to the bidirectional charging equipment 17. The user who wants to travel is therefore forced to use a mode of transportation other than the vehicle, such as the train 10 or the bus 11. This may reduce convenience for the user.

Accordingly, in the present embodiment, the CEMS server 2 is configured to implement power balancing of the microgrid MG while taking user benefits into account by sending and receiving information to and from the user terminal 9. The user benefits include user convenience in traveling and an economic value (reward) that will be given for participation in DR.

Specifically, the CEMS server 2 is configured so that, in a situation where the user of the vehicle sets a travel route using the mobile app installed on the user terminal 9, the CEMS server 2 presents to the user a travel route obtained in view of the user benefits based on a travel schedule entered by the user and power supply and demand performance information acquired from the power transmission and distribution operator server 5. By presenting the travel route to the user, the CEMS server 2 suggests the user to keep the vehicle connected to the power equipment on the date and time of travel, when it is expected that power balancing of the microgrid MG will be performed on the date and time of travel. The CEMS server 2 also gives a reward to the user who responded to the request for participation in power balancing according to this suggestion.

Setting of Travel Route

Figure 2:
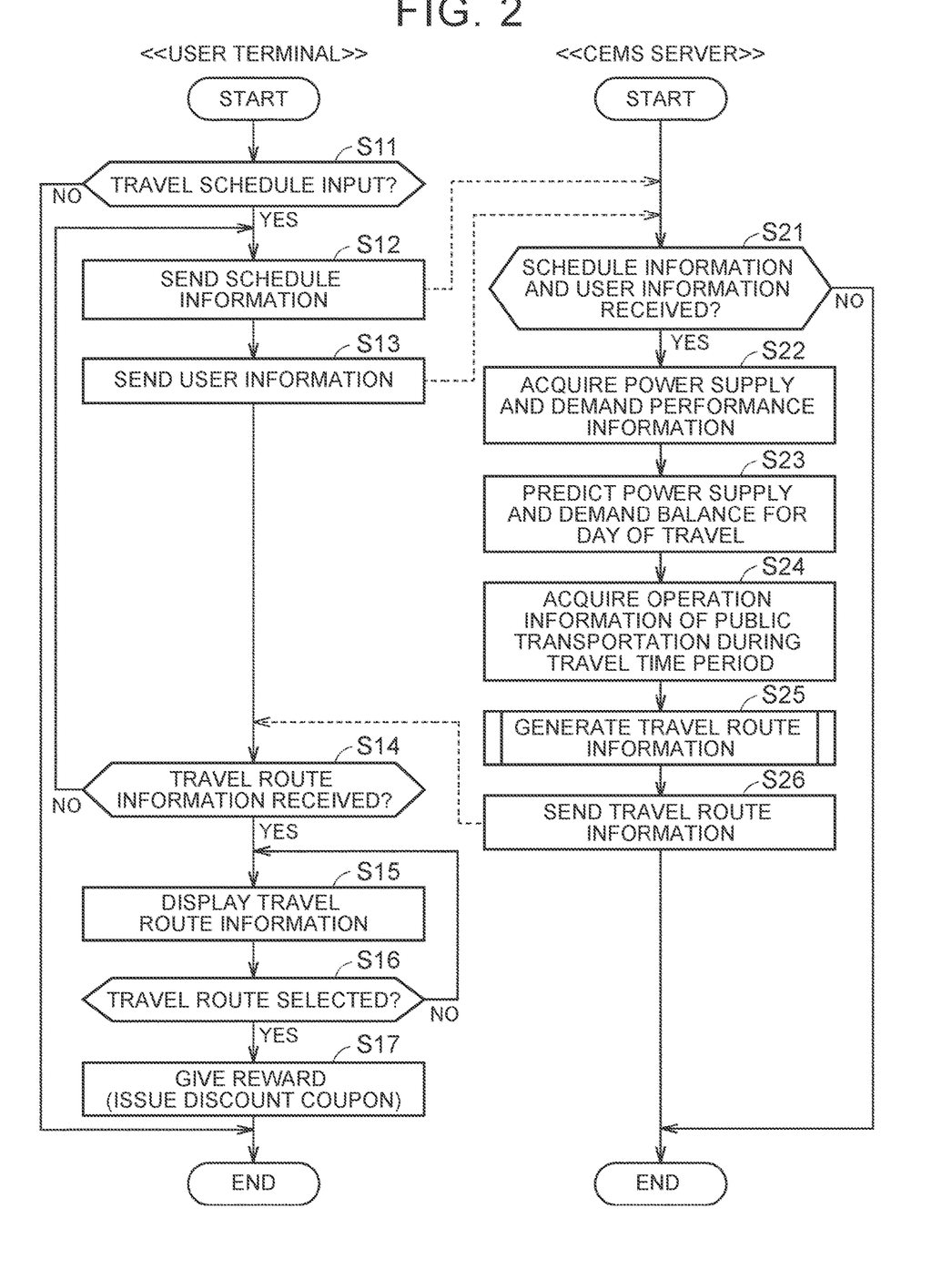
FIG. 2 is a flowchart of a process related to setting of a travel route with a user terminal.

FIG. 2 is a flowchart of a process related to setting of a travel route with the user terminal 9. This flowchart is called from a main routine, not shown, and repeatedly executed every time a predetermined condition is satisfied or in predetermined cycles. In FIG. 2, a series of steps to be performed by the user terminal 9 is shown on the left side, and a series of steps to be performed by the CEMS server 2 is shown on the right side. Each step is implemented by software processing by the user terminal 9 or the CEMS server 2, but may be implemented by hardware (electric circuit) in the user terminal 9 or the CEMS server 2. The term "step" is hereinafter abbreviated as "S."

As shown in FIG. 2, in S11, the user terminal 9 determines whether input regarding a travel schedule has been received from the user. The user can launch the mobile app and enter a travel schedule to the user terminal 9. The travel schedule includes information on the date and time of travel, departure point, and destination point. The travel schedule may further include information on scheduled departure time and/or scheduled arrival time.

When user input regarding a travel schedule has been received (YES in S11), the user terminal 9 generates schedule information including the travel schedule and the user's identification information (user ID) and sends the generated schedule information to the CEMS server 2 in S12.

The user terminal 9 also generates user information on the user and sends the generated user information to the CEMS server 2 in S13. The user information includes the user ID and information on attributes of the user. In the present embodiment, the attributes of a user refer to attributes that describe properties regarding the mobility of that user. For example, the attributes of a user include information such as age, able-bodied, with disabilities, pregnant, and having a child(ren). In general, elderly people tend to have less mobility than young people. People with disabilities tend to have less mobility than able-bodied people. Pregnant people and people having a child(ren) tend to have less mobility than people who are not pregnant and people who do not have any children. The user can skip entering attributes by registering his or her attributes in the mobile app in advance.

The CEMS server 2 determines whether schedule information and user information have been received from the user terminal 9 in S21. When schedule information and user information have been received from the user terminal 9 (YES in S21), the CEMS server 2 generates, based on the received information, travel route information indicating a travel route to be taken by the user who operated the user terminal 9.

Specifically, in S22, the CEMS server 2 accesses the power transmission and distribution operator server 5 to acquire information on power supply and demand performance on the microgrid MG. The power supply and demand performance information includes information on changes in power supply and demand balance on the microgrid MG and a history of DR events.

In S23, the CEMS server 2 predicts the power supply and demand balance for the day of travel using the date and time of travel included in the schedule information and the power supply and demand performance information acquired in S22. In S23, the CEMS server 2 predicts the power supply and demand balance for the day of travel by referring to the power supply and demand performance information under similar conditions of the season, weather, temperature, day of the week, etc. to those on the date and time of travel. The weather and temperature on the date and time of travel can be acquired from the Japan Meteorological Agency or other weather forecast services. The CEMS server 2 may predict the power supply and demand balance for the day of travel using a power supply and demand forecast produced by the power transmission and distribution operator server 5.

Thereafter, in S24, the CEMS server 2 accesses the public transportation server 6 to acquire operation information of public transportation during the travel time period for the day of travel. The travel time period can be set based on the scheduled departure time and/or scheduled arrival time included in the travel schedule. The operation information of public transportation includes operation schedules of the train 10 and the bus 11. The operation information may include information indicating the levels of crowdedness and the numbers of passengers on the train 10 and the bus 11 during the travel time period.

In S25, the CEMS server 2 generates travel route information indicating a travel route from the departure point to the destination point, based on the schedule information and user information acquired in S21, the power supply and demand balance for the day of travel predicted in S23, and the operation information of public transportation during the travel time period acquired in S24.

Figure 3:
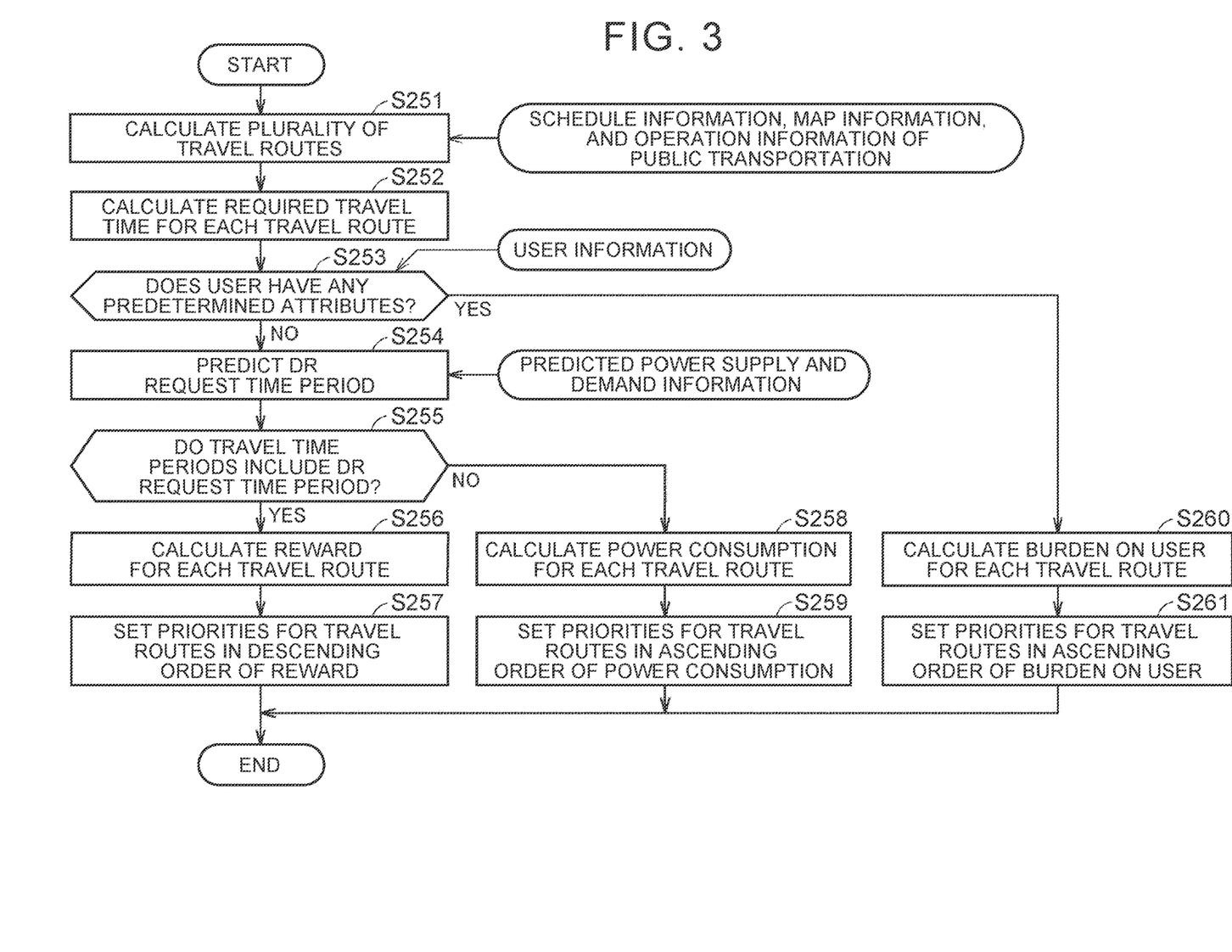
FIG. 3 is a flowchart of an example of a step of generating travel route information (S25 in FIG. 2)

FIG. 3 is a flowchart of an example of the step of generating travel route information (S25 in FIG. 2).

As shown in FIG. 3, in S251, the CEMS server 2 calculates a plurality of travel routes from the departure point to the destination point, based on the schedule information received from the user terminal 9, map information acquired in advance, and the operation information of public transportation acquired from the public transportation server 6. These travel routes include a travel route using the vehicle owned by the user (personally owned vehicle (POV)) and a travel route using public transportation such as the train 10 and the bus 11. The travel route using the POV corresponds to the "first travel route," and the travel route using public transportation corresponds to the "second travel route."

In S252, the CEMS server 2 calculates time required for the trip (required travel time) for each of the calculated travel routes. The required travel time of the travel route using the POV can be calculated based on, for example, the distance of the travel route and the average vehicle speed on the travel route. The average vehicle speed may be an actual value based on the driving history of the POV, or may be a value based on big data collected from vehicles of the same type as that of the POV. Alternatively, the required travel time may be calculated based on the driving history of the POV (or a vehicle of the same type as that of the POV).

The required travel time of the travel route using the train 10 and/or the bus 11 includes riding time on the train 10 and/or the bus 11, walking time from the departure point (e.g., home) to the nearest station or bus stop, and walking time from the alighting station or bus stop of the train 10 or the bus 11 to the destination point. The riding time on the train 10 and/or the bus 11 can be calculated based on the operation information of public transportation. The walking time from the departure point to the nearest station or bus stop can be calculated based on the distance from the departure point to the nearest station or bus stop and the average walking speed of adults. The walking time from the alighting station or bus stop to the destination point can be calculated based on the distance from the alighting station or bus stop to the destination point and the average walking speed of adults.

Subsequently, in S253, the CEMS server 2 determines, based on the user information, whether the user has any predetermined attributes. The predetermined attributes are attributes suggesting reduced mobility, and include, for example, elderly, with disabilities, pregnant, and having a child(ren). When the attributes of the user include at least one of the following: elderly, with disabilities, pregnant, and having a child(ren), the CEMS server 2 determines in step S253 that the user has a predetermined attribute(s). When the attributes of the user do not include any of the following: elderly, with disabilities, pregnant, and having a child(ren), the CEMS server 2 determines that the user does not have any predetermined attributes.

When the user has any predetermined attributes described above (YES in S253), the routine proceeds to S260, and the CEMS server 2 calculates physical burden that will be imposed on the user by each of the travel routes. In S260, the user's walking distance on each travel route is calculated as the physical burden. For example, in the case of the travel route using the POV from the departure point to the destination point, the user's walking distance is substantially zero. Therefore, the physical burden that will be imposed on the user is also substantially zero. On the other hand, for the travel route including walking from the departure point to the nearest station, riding on the train 10 from the nearest station to the alighting station, and walking from the alighting station to the destination point, the sum of the distances of these two walking sections is calculated as the physical burden. The longer the walking distance, the heavier the physical burden on the user is determined to be.

In S261, the CEMS server 2 sets priorities for the travel routes in ascending order of physical burden on the user. In S261, the highest priority is set for the travel route with the least physical burden, that is, the travel route with the shortest walking distance, out of the travel routes. The lowest priority is set for the travel route with the heaviest physical burden, that is, the travel route with the longest walking distance. The CEMS server 2 generates travel route information including the travel routes with the set priorities. On the other hand, when the user does not have any predetermined attributes in S253 (NO in S253), the routine proceeds to S254, and the CEMS server 2 predicts a time period during which participation in DR will be requested for the day of travel (hereinafter also referred to as "DR request time period"), based on the power supply and demand balance for the day of travel predicted in S23. The request for participation in DR includes the details of the requested power balancing (e.g., downward DR or upward DR) and the DR period (DR start time and DR end time). Upward DR is basically DR that requests an increase in demand. However, when the power balancing resources that receive a request are power generation equipment, upward DR may request a reduction in supply to the power balancing resources. Downward DR is DR that requests a reduction in demand or a reverse power flow.

In S255, the CEMS server 2 compares the travel time periods of the travel routes with the DR request time period predicted in S254, and determines whether the travel time periods include the DR request time period. The determination result in S255 is YES when at least the travel time period of the travel route using the POV includes the DR request time period. On the other hand, the determination result in step S255 is NO when the travel time period of the travel route using the POV does not include the DR request time period.

When the travel time periods of the travel routes include the DR request time period (when YES in S255), the CEMS server 2 calculates, for each of the travel routes, a reward to be given to the user of the vehicle for participation in DR in S256. The reward may be, for example, a discount on the fare of the train 10 or the bus 11. For example, the rewards may be funded by the electric power company or the management entity of the CEMS server 2 in order to encourage participation in DR. For the travel route using the POV, no reward will be given to the user because the vehicle cannot participate in DR.

In S257, the CEMS server 2 sets priorities for the travel routes in descending order of reward. In S257, the highest priority is set to the travel route with the highest reward out of the travel routes. The lowest priority is set to the travel route with the lowest reward. The CEMS server 2 generates travel route information including the travel routes with the set priorities.

Referring back to S255, when the travel time periods of the travel routes do not include the DR request time period in S255 (NO in S255), the routine proceeds to S258, and the CEMS server 2 calculates power consumption per occupant for each of the travel routes. For the travel route using the POV, the power consumption per occupant can be calculated based on, for example, the distance of the travel route and the electric mileage of the POV. The electric mileage of the POV may be an actual value based on the driving history of the POV, or may be a value based on big data collected from vehicles of the same type as that of the POV. Alternatively, the electric mileage of the POV may be calculated based on the driving history of the POV (or a vehicle of the same type as that of the POV).

For the travel route using the train 10, the power consumption per occupant can be calculated based on, for example, the travel distance of the train 10 on the travel route, the electric mileage of the train 10, and the average number of occupants on the train 10. The electric mileage of the train 10 and the average number of occupants on the train 10 may be actual values based on the travel history of the train 10, or may be values based on big data collected from trains of the same type as that of the train 10. In some embodiments, the average number of occupants on the train 10 is the average number of occupants during the travel time period of the travel route. The power consumption per occupant can be calculated by dividing the power consumption of the train 10 for the travel route by the average number of occupants on the train 10.

For the travel route using the bus 11 as well, the power consumption per occupant can be calculated based on, for example, the travel distance of the bus 11 on the travel route, the electric mileage of the bus 11, and the average number of occupants on the bus 11, similarly to the travel route using the train 10. The electric mileage of the bus 11 and the average number of occupants on the bus 11 may be actual values based on the travel history of the bus 11, or may be values based on big data collected from buses of the same type as that of the bus 11. In some embodiments, the average number of occupants on the bus 11 is the average number of occupants during the travel time period of the travel route. The power consumption per occupant can be calculated by dividing the power consumption of the bus 11 for the travel route by the average number of occupants on the bus 11.

In S259, the CEMS server 2 sets priorities for the travel routes in ascending order of power consumption per occupant. In S259, the highest priority is set to the travel route with the least power consumption per occupant out of the travel routes. The lowest priority is set to the travel route with the largest power consumption per occupant. The CEMS server 2 generates travel route information including the travel routes with the set priorities.

Referring back to FIG. 2, the CEMS server 2 sends the generated travel route information to the user terminal 9 in S26.

The user terminal 9 determines in S14 whether travel route information has been received from the CEMS server 2. In S14, when no travel route information has been received from the CEMS server 2 within a predetermined time from when the schedule information and the user information were sent to the CEMS server 2 (NO in S14), the routine returns to S12, and the user terminal 9 sends the schedule information and the user information to the CEMS server 2 again.

When travel route information has been received from the CEMS server 2 within the predetermined time from when the schedule information and the user information were sent to the CEMS server 2 (YES in S14), the user terminal 9 presents the travel routes to the user by displaying the received travel route information on the touch panel display of the user terminal 9 in S15.

In S16, the user terminal 9 determines whether any one of the travel routes has been selected. The determination result in S16 is YES when the touch panel display has received a user operation to select one of the travel routes.

When any one of the travel routes has been selected (YES in S16), the routine proceeds to S17, and the user terminal 9 gives the reward set for the selected travel route to the user. In S17, when the travel route using public transportation has been selected, a coupon for a discount on the fare of the train 10 or the bus 11 is issued as a reward. The discount coupon can be used when using the train 10 or the bus 11. When the travel route using the POV has been selected, no discount coupon is issued because no reward will be given.

Travel Route Display Examples

Next, presentation examples (display examples) of the travel routes obtained by the above process will be described. In the following description, the travel routes include four travel routes R1 to R4. The travel route R1 is a travel route using the train 10. The travel route R2 is a travel route using the bus 11 and the train 10. The travel route R3 is a travel route using the bus 11. The travel route R4 is a travel route using the POV.

First Display Example

Figure 4:
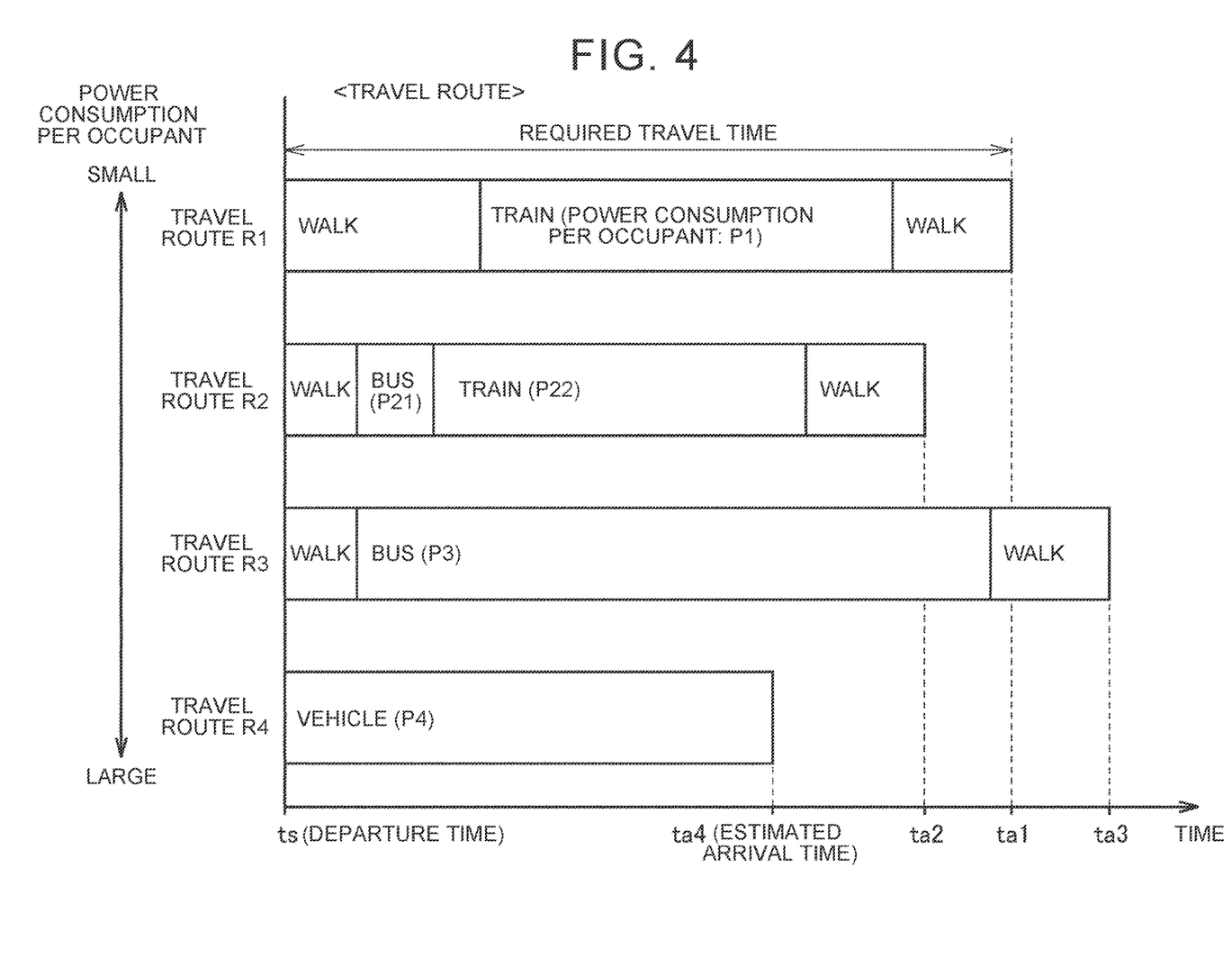
FIG. 4 shows a display example based on travel route information generated in S259 of FIG. 3.

FIG. 4 shows a display example based on the travel route information
generated in S259 of FIG. 3. In S259 of FIG. 3, priorities (highest to fourth highest) are set for the four travel routes R1 to R4 in ascending order of power consumption per occupant.

As shown in FIG. 4, the four travel routes R1 to R4 are displayed in descending order of priority. Departure time, estimated arrival time, and required travel time are displayed for each travel route. A breakdown of each travel route is also displayed. Since none of the travel time periods of the travel routes include the DR request time period, the travel route information does not include information on a reward.

The travel route with the highest priority is the travel route R1. The travel route R1 includes walking from the departure point to the nearest station, riding on the train 10 from the nearest station to the alighting station, and walking from the alighting station to the destination point. Power consumption P1 per occupant is the power consumption per occupant while the train 10 travels from the boarding station to the alighting station.

The travel route with the second highest priority is the travel route R2. The travel route R2 includes walking from the departure point to the nearest bus stop, riding on the bus 11 from this bus stop to the boarding station, riding on the train 10 from the boarding station to the alighting station, and walking from the alighting station to the destination point. Power consumption P21 per occupant is the power consumption per occupant of the bus 11 while the bus 11 travels from the bus stop to the boarding station. Power consumption P22 per occupant is the power consumption per occupant of the train 10 while the train 10 travels from the boarding station to the alighting station. Power consumption P2 per occupant for the travel route R2 is "P21+P22."

The travel route with the third highest priority is the travel route R3. The travel route R3 includes walking from the departure point to the nearest bus stop, riding on the bus 11 from the nearest bus stop to the alighting bus stop, and walking from the alighting bus stop to the destination point. Power consumption P3 per occupant is the power consumption per occupant while the bus 11 travels from the bus stop to the alighting bus stop.

The travel route with the fourth highest priority is the travel route R4. The travel route R4 includes driving of the vehicle (POV) from the departure point to the destination point. Power consumption P4 per occupant is the power consumption per occupant while the POV travels from the departure point to the destination point. P1 to P4 have a relationship of "P1<P2<P3<P4."

The user can select one of the travel routes R1 to R4 in view of his or her schedule for the day of travel etc. by comparing the required travel time, estimated arrival time, and power consumption among the travel routes R1 to R4. For example, if the user is tight on time, the user can select the travel route R4 with the earliest estimated arrival time. If the user is not tight on time, the user can select one of the travel routes R1 to R3 with smaller power consumption per occupant than that of the travel route R4. The user can contribute to a reduction in power consumption on the microgrid MG by taking a travel route with small power consumption.

Second Display Example

Figure 5:
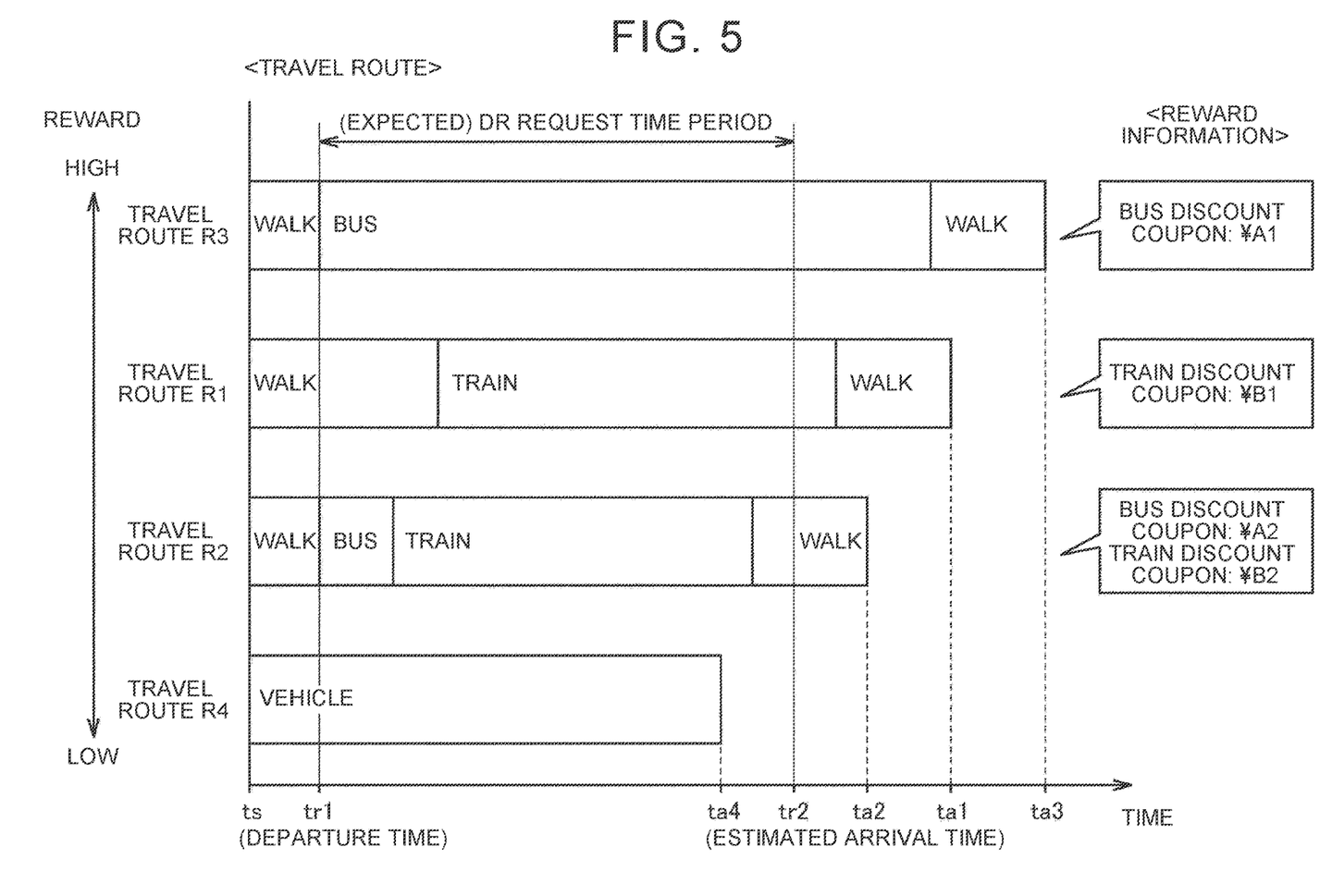
FIG. 5 shows a display example based on travel route information generated in S257 of FIG. 3.

FIG. 5 shows a display example based on the travel route information generated in S257 of FIG. 3. In S257 of FIG. 3, priorities are set for the four travel routes R1 to R4 in descending order of reward.

As shown in FIG. 5, the four travel routes R1 to R4 are displayed in descending order of priority. As in the display example of FIG. 4, the departure time, estimated arrival time, required travel time, and breakdown of each travel route are shown in the display example of FIG. 5. In addition, the DR request time period and the reward that will be given to users who participated in DR for each travel route are also shown in the display example of FIG. 5.

The travel route with the highest priority is the travel route R3. For the travel route R3, a coupon for a discount on the fare of the bus 11 (A1 yen) will be given to the user as a reward.

The travel route with the second highest priority is the travel route R1. For the travel route R1, a coupon for a discount on the fare of the train 10 (B1 yen) will be given to the user as a reward.

The travel route with the third highest priority is the travel route R2. For the travel route R2, a coupon for a discount on the fare of the bus 11 (A2 yen) and a coupon for a discount on the fare of the train 10 (B2 yen) will be given to the user as a reward. That is, the reward for the travel route R2 is "A2+B2" yen. The travel route with the fourth highest priority is the travel route R4. For the travel route R4, the reward is zero yen since the POV cannot participate in DR. A1, B1, A2+B2, and zero have a relationship of 0<A2+B2<B1<A1.

The user can select one of the travel routes R1 to R4 in view of his or her schedule for the day of travel etc. by comparing the required travel time, estimated arrival time, and reward among the travel routes R1 to R4. For example, if the user is tight on time, the user can select the travel route R4 with no reward but the earliest estimated arrival time. If the user is not tight on time, the user can select one of the travel routes R1 to R3 by comparing the amount of the reward among the travel routes R1 to R3. With the travel routes R1 to R3, it is possible to adjust the power supply and demand balance on the microgrid MG because the POV can participate in DR.

Third Display Example

Figure 6:
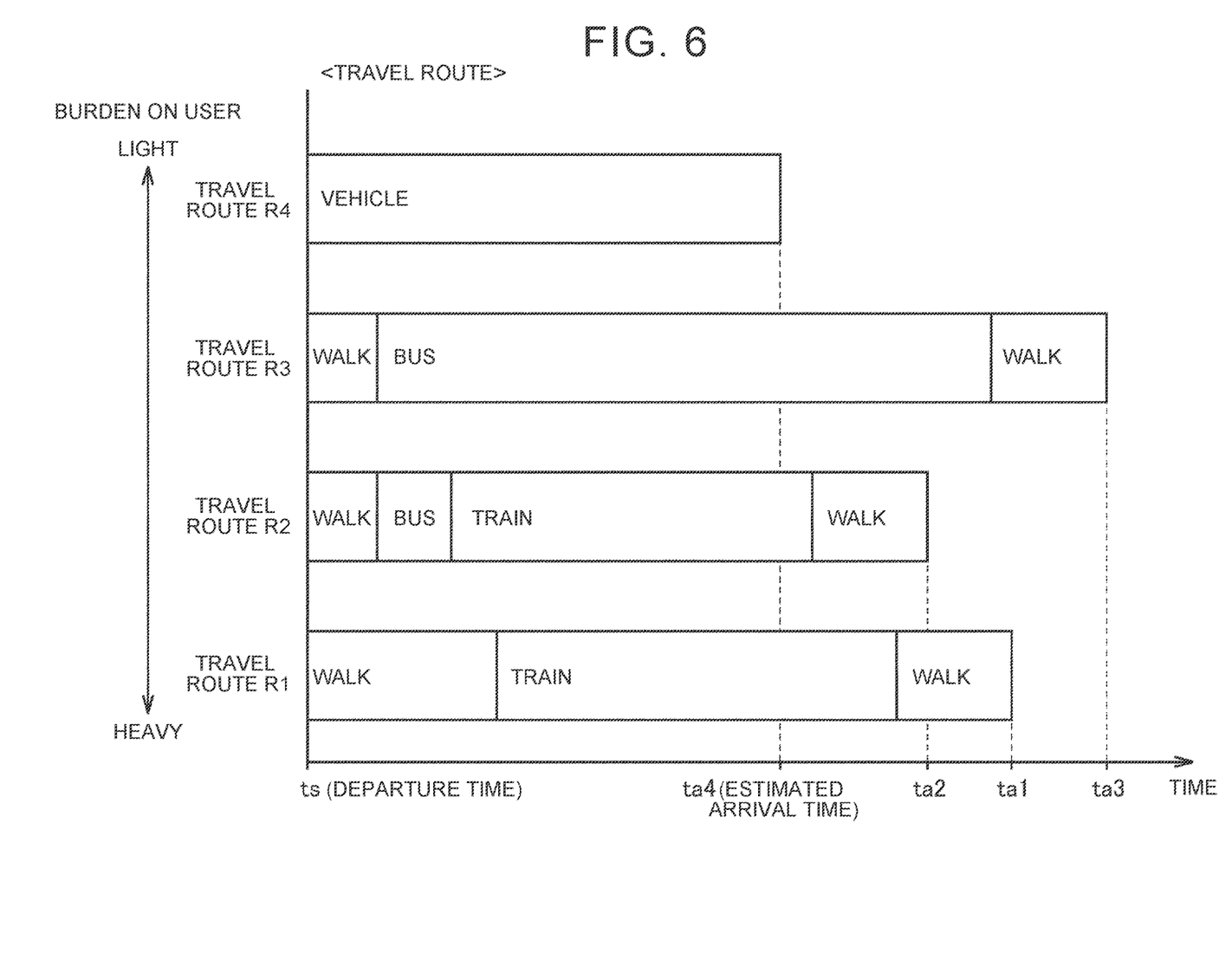
FIG. 6 shows a display example based on travel route information generated in S261 of FIG. 3.

FIG. 6 shows a display example based on the travel route information generated in S261 of FIG. 3. In S261 of FIG. 3, priorities are set for the four travel routes R1 to R4 in ascending order of physical burden on the user. As described above, the physical burden on the user is based on the user's walking distance.

As shown in FIG. 6, the four travel routes R1 to R4 are displayed in descending order of priority. As in the display example of FIG. 4, the departure time, estimated arrival time, required travel time, and breakdown of each travel route are shown in the display example of FIG. 6.

The travel route with the highest priority is the travel route R4. The travel route with the second highest priority is the travel route R3. The travel route with the third highest priority is the travel route R2. The travel route with the fourth highest priority is the travel route R1. The travel route R4 imposes the least physical burden on the user. The travel route R1 imposes the heaviest physical burden on the user.

The display example of FIG. 6 is applied when the user has any predetermined attributes. As described above, the predetermined attributes are attributes suggesting that the user has reduced mobility, and include, for example, elderly, with disabilities, pregnant, and having a child(ren). In the present embodiment, when the attributes of the user include at least one of the following: elderly, with disabilities, pregnant, and having a child(ren), it is determined that the user has a predetermined attribute(s).

The user can select one of the travel routes R1 to R4 by comparing the required travel time, estimated arrival time, and physical burden among the travel routes R1 to R4. For example, a user with reduced mobility can select the travel route R4 that imposes the least physical burden. Alternatively, the user can select one of the travel routes R1 to R3 by comparing the estimated arrival time and required travel time among the travel routes R1 to R3.

As described above, with the server and the power supply and demand balancing method according to the embodiment, the user can select to either travel to the destination point with the vehicle on the day of travel, or keep the vehicle connected to the power equipment as suggested by the server to have the vehicle participate in adjusting the power supply and demand balance, based on his or her schedule for the day of travel. The user can receive a reward in the case where the user uses a mode of transportation other than the vehicle on the day of travel to have the vehicle participate in adjusting the power supply and demand balance. The server can thus encourage the user to have the vehicle participate in adjusting the power supply and demand balance while ensuring convenience and economic value for the user. It is therefore possible to keep the power supply and demand balance while taking user benefits into account.

The embodiment disclosed herein should be considered to be illustrative in all respects and not restrictive. The scope of the present disclosure is defined by the claims rather than by the above description of the embodiment. The present disclosure includes all modifications within the meaning and scope equivalent to the claims.

What is claimed is:

1. A server that is configured to manage power balancing resources electrically connected to a power network, the power balancing resources including power equipment configured to supply power from a vehicle to the power network and to charge the vehicle from the power network, the server comprising:
    a processor; and
    a memory storing a program that is executable by the processor, wherein
    the processor is configured to, in response to receipt of input of a travel schedule including a date and time of travel, a departure point, and a destination point from a user of the vehicle, predict a power supply and demand balance on the power network for the date and time of travel according to the program, based on power supply and demand performance information of the power network;
    the processor is configured to access information regarding public transportation during the travel time period for the day of travel;
    the processor is configured to generate travel route information indicating a travel route from the departure point to the destination point based on the travel schedule and the information regarding public transportation;
    the processor is configured to, in response to prediction that the power supply and demand balance is going to be adjusted on the date and time of travel, provide the user at least one of:
        suggestion to keep the vehicle connected to the power equipment on the date and time of travel; and
        a reward for the vehicle responding to a request to adjust the power supply and demand balance.

2. The server according to claim 1, wherein the processor is configured to suggest traveling from the departure point to the destination point using public transportation as the suggestion.

3. The server according to claim 2, wherein the processor is configured to:
    create a first travel route using the vehicle and at least one second travel route using the public transportation, based on the travel schedule; and
    present the first travel route and the at least one second travel route together with required travel time of each travel route to the user.

4. The server according to claim 3, wherein the processor is configured to:
    calculate, for each of the first travel route and the at least one second travel route, power consumption per occupant during the required travel time;
    set priorities for the first travel route and the at least one second travel route in ascending order of the power consumption per occupant; and
    present the first travel route and the at least one second travel route to the user in descending order of priority.

5. The server according to claim 1, wherein the processor is configured to:
    predict, based on the power supply and demand performance information, a time period during which the power supply and demand balance is going to be adjusted on the date and time of travel; and
    present the predicted time period to the user.

6. The server according to claim 1, wherein the processor is configured to present information on the reward to the user.

7. The server according to claim 1, wherein the processor is configured to, when the processor receives input of an attribute of the user together with the travel schedule, determine whether to provide the user the suggestion depending on the attribute of the user.

8. The server according to claim 7, wherein:
the processor is configured to provide the suggestion when the user has a first attribute, and not to provide the suggestion when the user has a second attribute;
the first attribute includes able-bodied; and
the second attribute includes at least one of following: with disabilities, elderly, pregnant, and having a child.

9. The server according to claim 8, wherein the processor is configured to:
create a first travel route using the vehicle and at least one second travel route using public transportation, based on the travel schedule;
calculate, for each of the first travel route and the at least one second travel route, the reward to be provided to the user and physical burden on the user;
set priorities for the first travel route and the at least one second travel route in descending order of the reward when the user has the first attribute;
set priorities for the first travel route and the at least one second travel route in ascending order of the physical burden when the user has the second attribute; and
present the first travel route and the at least one second travel route to the user in descending order of priority.

10. A power supply and demand balancing method in which power balancing resources electrically connected to a power network is managed, the power balancing resources including power equipment configured to supply power from a vehicle to the power network and to charge the vehicle from the power network, the power supply and demand balancing method comprising:
in response to receipt of input of a travel schedule including a date and time of travel, a departure point, and a destination point from a user of the vehicle, predicting a power supply and demand balance on the power network for the date and time of travel, based on power supply and demand performance information of the power network;
accessing information regarding public transportation during the travel time period for the day of travel;
generating travel route information indicating a travel route from the departure point to the destination point based on the travel schedule and the information regarding public transportation;
in response to prediction that the power supply and demand balance is going to be adjusted on the date and time of travel, providing the user at least one of:
suggestion to keep the vehicle connected to the power equipment on the date and time of travel; and
a reward for the vehicle responding to a request to adjust the power supply and demand balance.

11. A server that is configured to manage power balancing resources electrically connected to a power network, the power balancing resources including power equipment configured to supply power from a vehicle to the power network and to charge the vehicle from the power network, the server comprising:
a processor; and
a memory storing a program that is executable by the processor, wherein
the processor is configured to, in response to receipt of input of a travel schedule including a date and time of travel, a departure point, and a destination point from a user of the vehicle, predict a power supply and demand balance on the power network for the date and time of travel according to the program, based on power supply and demand performance information of the power network, and
the processor is configured to, in response to prediction that the power supply and demand balance is going to be adjusted on the date and time of travel:
suggest the user to travel from the departure point to the destination point using public transportation;
keep the vehicle connected to the power equipment on the date and time of travel;
create a first travel route using the vehicle and at least one second travel route using the public transportation, based on the travel schedule; and
display, on a touch panel display of a user terminal that communicates with the server, the first travel route and the at least one second travel route together with required travel time of each travel route to present each travel route to the user.

\* \* \* \* \*